United States Patent
Miyake et al.

(10) Patent No.: US 10,291,089 B2
(45) Date of Patent: May 14, 2019

(54) MOTOR AND DISK DRIVE APPARATUS

(71) Applicant: Nidec Corporation, Kyoto (JP)

(72) Inventors: Takuo Miyake, Kyoto (JP); Tadashi Hasegawa, Kyoto (JP); Yoichi Sekii, Kyoto (JP); Keigo Kobayashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 453 days.

(21) Appl. No.: 15/299,704

(22) Filed: Oct. 21, 2016

(65) Prior Publication Data

US 2017/0353068 A1 Dec. 7, 2017

Related U.S. Application Data

(60) Provisional application No. 62/346,671, filed on Jun. 7, 2016.

(51) Int. Cl.
| | |
|---|---|
| *H02K 1/28* | (2006.01) |
| *H02K 1/27* | (2006.01) |
| *H02K 21/12* | (2006.01) |
| *H02K 21/22* | (2006.01) |
| *H02K 1/30* | (2006.01) |
| *H02K 1/14* | (2006.01) |
| *H02K 3/18* | (2006.01) |

(Continued)

(52) U.S. Cl.
CPC ........ *H02K 1/2786* (2013.01); *G11B 19/2045* (2013.01); *H02K 1/14* (2013.01); *H02K 1/28* (2013.01); *H02K 3/18* (2013.01); *H02K 9/06* (2013.01); *H02K 2213/03* (2013.01)

(58) Field of Classification Search
CPC .......... H02K 1/2786; H02K 1/28; H02K 1/30; H02K 21/12; H02K 21/22
USPC ............................. 310/67 R, 156.08, 156.12
See application file for complete search history.

(56) References Cited

U.S. PATENT DOCUMENTS

| | | | | |
|---|---|---|---|---|
| 5,334,896 A | * | 8/1994 | Ohsawa ............... | G11B 17/038 310/267 |
| 6,249,505 B1 | * | 6/2001 | Miyamoto ........... | F16F 15/363 360/99.08 |

(Continued)

FOREIGN PATENT DOCUMENTS

| | | | | |
|---|---|---|---|---|
| JP | 06296338 A | * | 10/1994 | |
| JP | 7-75275 A | | 3/1995 | |
| JP | 09149586 A | * | 6/1997 | ............ F16C 25/045 |

*Primary Examiner* — Jeremy A Luks
(74) *Attorney, Agent, or Firm* — Keating & Bennett, LLP (57) ABSTRACT

A hub of this motor includes a hub annular portion being annular and arranged above a stator, and a flange portion arranged to extend radially outward from the hub annular portion, and including an upper surface on which an annular member is arranged. A yoke includes a first yoke cylindrical portion to which a magnet is fixed; a yoke annular portion arranged to extend radially inward from an upper end of the first yoke cylindrical portion, and including an upper surface arranged opposite to a lower surface of the hub; and a second yoke cylindrical portion arranged to extend axially upward from a radially inner end portion of the yoke annular portion. An inner circumferential surface of the hub annular portion and an outer circumferential surface of the second yoke cylindrical portion are fixed to each other at an engagement portion arranged radially inward of a radially inner end portion of each of coils.

12 Claims, 6 Drawing Sheets

(51) Int. Cl.
  *H02K 9/06*     (2006.01)
  *G11B 19/20*    (2006.01)

(56) References Cited

U.S. PATENT DOCUMENTS

| | | | |
|---|---|---|---|
| 8,164,850 B2* | 4/2012 | Gomyo | F16C 17/107 |
| | | | 360/98.07 |
| 8,780,493 B1* | 7/2014 | Park | H02K 1/2786 |
| | | | 360/99.08 |
| 9,065,315 B1* | 6/2015 | Ochitani | H02K 1/30 |
| 2009/0022436 A1* | 1/2009 | Kunio | F16C 17/107 |
| | | | 384/12 |

* cited by examiner

MOTOR AND DISK DRIVE APPARATUS

CROSS REFERENCE TO RELATED APPLICATIONS

This application claims the benefit of priority to U.S. Provisional Application No. 62/346,671 filed Jun. 7, 2016. The entire contents of this application is hereby incorporated herein by reference.

BACKGROUND OF THE INVENTION

1. Field of the Invention

The present invention relates to a motor and a disk drive apparatus.

2. Description of the Related Art

Motors arranged to rotate disks are typically installed in hard disk apparatuses and optical disk apparatuses. A known motor is described, for example, in JP-A 7-75275. The motor described in JP-A 7-75275 includes a hub made of aluminum, fixed to an upper end portion of a shaft, and arranged to rotate together with the shaft, and a disk is mounted on and attached to a collar portion of the hub. A cylindrical yoke made of iron is attached to a lower surface of the collar portion of the hub through, for example, shrink fitting, and a rotor magnet is attached to an inner circumference of the yoke.

In the motor described in JP-A 7-75275, the yoke is fixed to the lower surface of the collar portion of the hub at a position close to a position at which the disk or the like is mounted on the hub. In this case, the collar portion may be deformed when the yoke is fixed thereto through shrink fitting or press fitting, and this in turn may lead to an abnormal rotation of the disk or the like mounted on the hub. Moreover, an error in reading or writing from or to the disk may occur.

SUMMARY OF THE INVENTION

A motor according to a preferred embodiment of the present invention is arranged to rotate an annular member, and includes a stationary portion including a stator, and a rotating portion arranged to be rotatable about a central axis extending in a vertical direction. The rotating portion includes a hub arranged to extend in an annular shape around the central axis, a magnet including a pole surface arranged radially opposite to the stator, and a yoke to which the magnet is fixed. The stator includes a stator core including a plurality of teeth arranged to project radially outward, and a plurality of coils each of which is defined by a conducting wire wound around a separate one of the teeth. The hub includes a hub annular portion being annular and arranged above the stator; and a flange portion arranged to extend radially outward from the hub annular portion, and including an upper surface on which the annular member is arranged. The yoke includes a first yoke cylindrical portion to which the magnet is fixed; a yoke annular portion arranged to extend radially inward from an upper end of the first yoke cylindrical portion, and including an upper surface arranged opposite to a lower surface of the hub; and a second yoke cylindrical portion arranged to extend axially upward from a radially inner end portion of the yoke annular portion. An inner circumferential surface of the hub annular portion and an outer circumferential surface of the second yoke cylindrical portion are fixed to each other at an engagement portion arranged radially inward of a radially inner end portion of each coil.

According to the above preferred embodiment of the present invention, the engagement portion at which the yoke is fixed to the hub is arranged at a position away from the flange portion of the hub on which the annular member, e.g., a disk, is arranged. This reduces an influence of a stress applied when the yoke is fixed to the hub on the flange portion. This in turn contributes to preventing a deformation of the flange portion, and to stable rotation of the annular member, which may include a disk or an impeller.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor is referred to by the term "axial direction", "axial", or "axially", that directions perpendicular to the central axis of the motor are referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a hub on which an annular member including a disk is arranged is arranged with respect to a stator is defined as an upper side. The shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus according to any preferred embodiment of the present invention when in use.

Also note that the wording "parallel direction" as used herein includes both parallel and substantially parallel directions. Also note that the wording "perpendicular direction" as used herein includes both perpendicular and substantially perpendicular directions.

Figure 1:
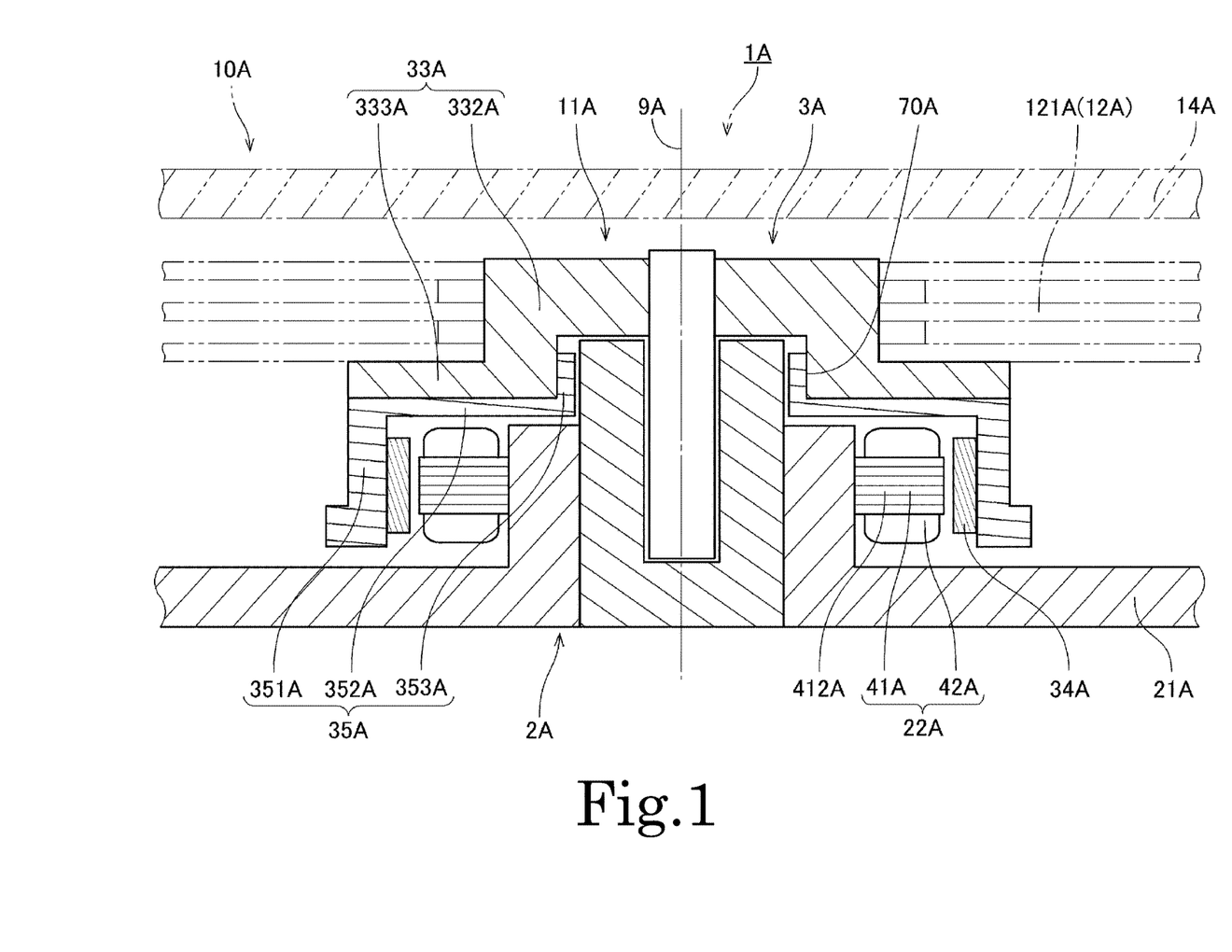
FIG. 1 is a vertical sectional view of a motor according to a first preferred embodiment of the present invention.

A stationary portion 2A includes a base portion 21A and a stator 22A. The stator 22A is held by the base portion 21A. Referring to FIG. 1, the stator 22A includes a stator core 41A including a plurality of teeth 412A arranged to project radially outward, and a plurality of coils 42A arranged in a circumferential direction. A conducting wire is wound around each of the teeth 412A to define the coils 42A.

A rotating portion 3A includes a hub 33A, a magnet 34A, and a yoke 35A. The hub 33A is arranged axially above the base portion 21A, and is arranged to extend in an annular shape around a central axis 9A. The magnet 34A is substantially cylindrical, and includes a pole surface arranged radially opposite to the stator 22A. The magnet 34A is fixed to the yoke 35A.

The hub 33A includes a hub annular portion 332A, which is annular in shape, and a flange portion 333A. The hub annular portion 332A is arranged above the stator 22A. The flange portion 333A is arranged to extend radially outward from the hub annular portion 332A. One of disks 121A is arranged on an upper surface of the flange portion 333A.

The yoke 35A includes a first yoke cylindrical portion 351A, a yoke annular portion 352A, and a second yoke cylindrical portion 353A. The magnet 34A is fixed to a radially inner side of the first yoke cylindrical portion 351A. The yoke annular portion 352A is arranged to extend radially inward from an upper end of the first yoke cylindrical portion 351A, and an upper surface of the yoke annular portion 352A is arranged opposite to a lower surface of the hub 33A. The second yoke cylindrical portion 353A is arranged to extend axially upward from a radially inner end portion of the yoke annular portion 352A. Note that, when the upper surface of the yoke annular portion 352A is described as being arranged "opposite to" the lower surface of the hub 33A, it may mean either that the upper surface of the yoke annular portion 352A is arranged opposite to the lower surface of the hub 33A with a gap therebetween, or that the upper surface of the yoke annular portion 352A is arranged to be in contact with the lower surface of the hub 33A.

Referring to FIG. 1, an inner circumferential surface of the hub annular portion 332A and an outer circumferential surface of the second yoke cylindrical portion 353A are fixed to each other at a position radially inward of a radially inner end portion of each coil 42A. An engagement portion 70A is thus defined. Arranging the engagement portion 70A away from and radially inward of the flange portion 333A reduces an influence, on the flange portion 333A, of a stress applied when the inner circumferential surface of the hub annular portion 332A and the outer circumferential surface of the second yoke cylindrical portion 353A are fixed to each other. This contributes to preventing the flange portion 333A from being deformed. In addition, stable rotation of the disks 121A will be achieved. Moreover, the likelihood that an error in reading from any disk 121A will occur due to a deformation of the hub 33A is reduced.

Figure 2:
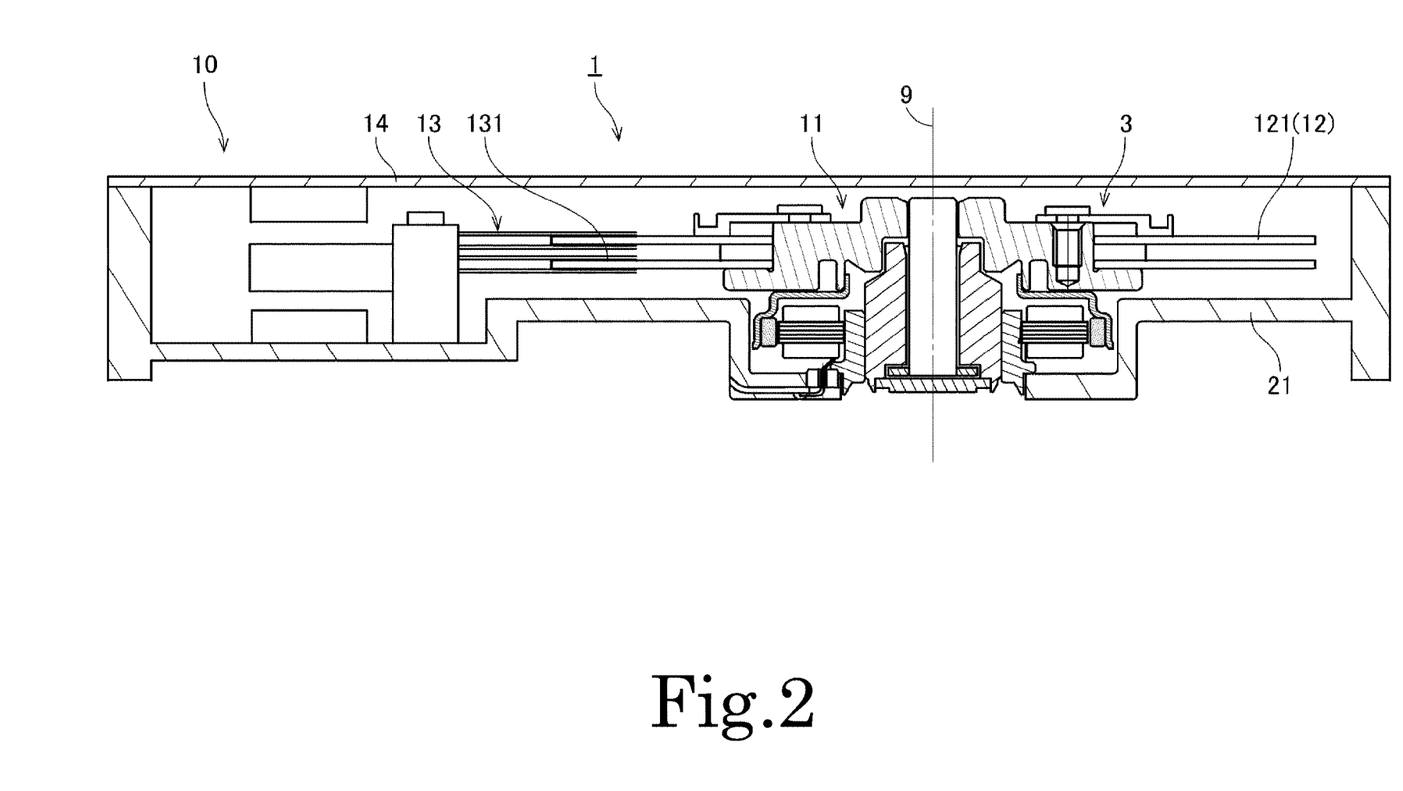
FIG. 2 is a vertical sectional view of a disk drive apparatus according to a second preferred embodiment of the present invention.

FIG. 2 is a vertical sectional view of a disk drive apparatus 1 according to a second preferred embodiment of the present invention. The disk drive apparatus 1 is an apparatus arranged to perform reading and writing of information from or to magnetic disks 121, each of which is an annular member including a circular hole in a center thereof, while rotating the magnetic disks 121. Referring to FIG. 2, the disk drive apparatus 1 includes a motor 11, two magnetic disks 121, an access portion 13, and a cover 14.

The motor 11 is arranged to rotate the magnetic disks 121 about a central axis 9 while supporting the magnetic disks 121. The motor 11 includes a base portion 21 arranged to extend radially below the magnetic disks 121. At least a portion of the motor 11, the magnetic disks 121, and the access portion 13 are accommodated in a housing 10 made up of the base portion 21 and the cover 14. The access portion 13 is arranged to move heads 131 along recording surfaces of the magnetic disks 121 to perform at least one of the reading and the writing of information from or to the magnetic disks 121.

Note that the number of magnetic disks 121 included in the disk drive apparatus 1 may alternatively be one or more than two.

An interior space of the housing 10 is preferably a clean space with extremely little dirt or dust. According to the present preferred embodiment, the interior of the housing 10 is filled with a clean air. Note, however, that the interior of the housing 10 may alternatively be filled with a helium gas, a hydrogen gas, or a nitrogen gas instead of air. Also note that the interior of the housing 10 may alternatively be filled with a mixture of any of these gases and air.

Figure 3:
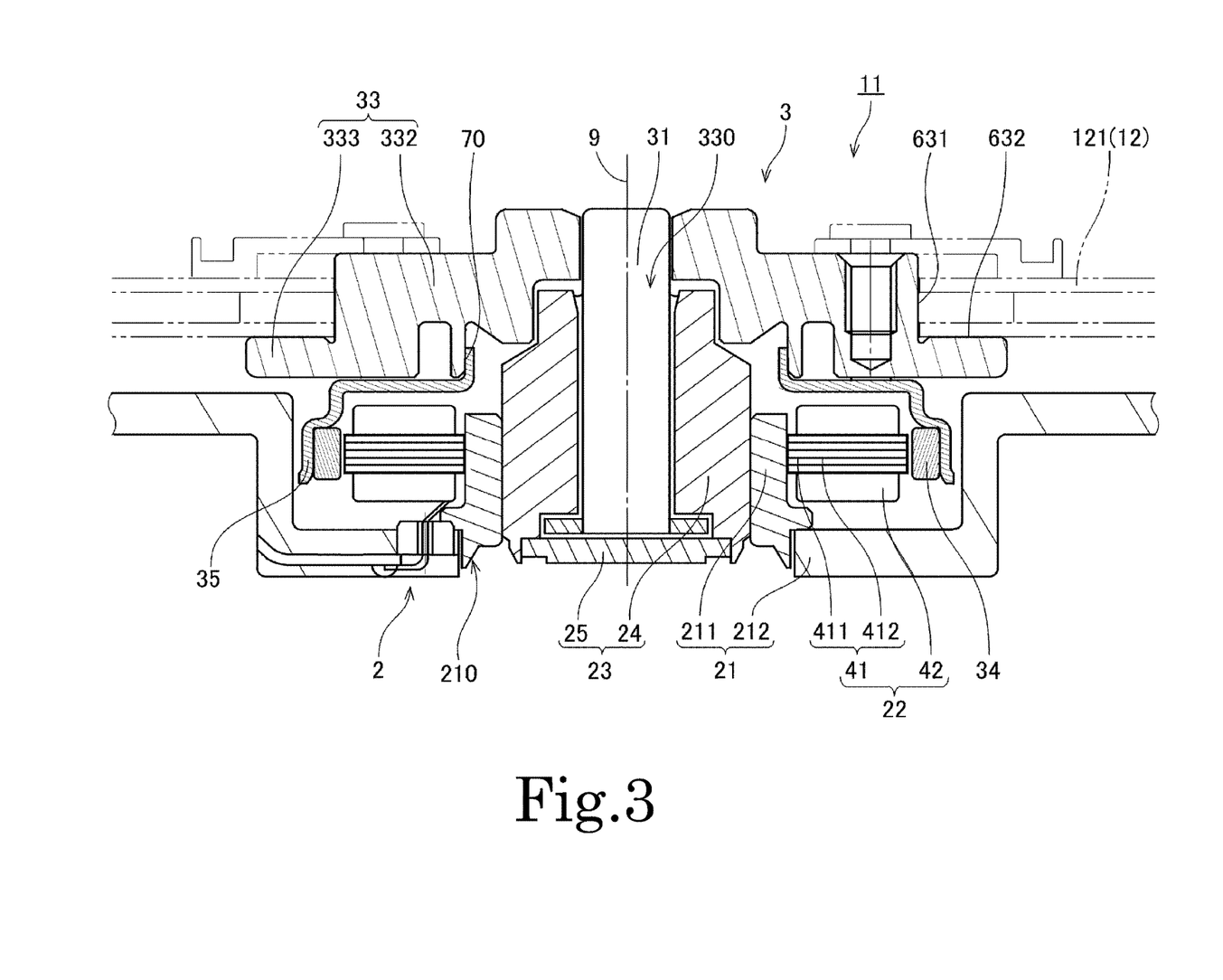
FIG. 3 is a vertical sectional view of a motor according to the second preferred embodiment.

Next, the structure of the aforementioned motor 11 will now be described below. FIG. 3 is a vertical sectional view of the motor 11 according to the second preferred embodiment. Referring to FIG. 3, the motor 11 includes a stationary portion 2 and a rotating portion 3. The stationary portion 2 is arranged to be stationary relative to the housing 10 of the disk drive apparatus 1. The rotating portion 3 is supported to be rotatable with respect to the stationary portion 2.

The stationary portion 2 according to the present preferred embodiment includes the base portion 21, a stator 22, and a bearing 23 arranged to rotatably support a shaft 31, which will be described below. The base portion 21 includes a stator holder 211 and a mounting plate 212.

The mounting plate 212 is a plate-shaped member arranged to support the stator holder 211. A metal, such as, for example, stainless steel, is used as a material of the mounting plate 212. The mounting plate 212 is arranged to extend radially outward from an outer circumference of the stator holder 211. In addition, the mounting plate 212 includes a circular through hole 210 in which a lower end portion of the stator holder 211 is fitted. When the motor 11 is used, the mounting plate 212 is fixed to a frame of a device through, for example, screwing. Note that a circuit board to supply electric drive currents to coils 42 of the stator 22, which will be described below, may be arranged on a surface of the mounting plate 212.

The stator holder 211 is a substantially cylindrical member extending in the axial direction. The lower end portion of the stator holder 211 is inserted into the through hole 210 of the mounting plate 212, and is fixed to the mounting plate 212 by crimping. Note, however, that the stator holder 211 may alternatively be fixed to the mounting plate 212 by another method, such as, for example, welding. Also note that the mounting plate 212 and the stator holder 211 may alternatively be defined by a single continuous monolithic member.

The stator 22 is an armature including a stator core 41 and the coils 42. The stator core 41 is, for example, defined by laminated steel sheets, that is, electromagnetic steel sheets, such as silicon steel sheets, placed one upon another in the axial direction. The stator core 41 is fixed to an outer circumferential surface of the stator holder 211 through, for example, an adhesive. In addition, the stator core 41 includes an annular core back 411 and a plurality of teeth 412 arranged to project radially outward from the core back 411. The coils 42 are a collection of conducting wires wound around the teeth 412. The teeth 412 and the coils 42 are arranged in an annular shape with the central axis 9 as a center.

The bearing 23 includes a sleeve 24 arranged to extend in the axial direction to assume a substantially cylindrical shape around the shaft 31, and a disk-shaped cap 25 arranged to close an opening at a lower end of the sleeve 24. A lower portion of the sleeve 24 is inserted into a space radially inside of the stator holder 211, and is fixed to the stator holder 211 through, for example, an adhesive. An upper end portion of the sleeve 24 is arranged axially above an upper end portion of the stator holder 211 and an upper end portion of the stator 22. An inner circumferential surface of the sleeve 24 is arranged radially opposite to an outer circumferential surface of the shaft 31.

The rotating portion 3 according to the present preferred embodiment includes the shaft 31, a hub 33, a magnet 34, and a yoke 35.

The shaft 31 is a columnar member arranged to be substantially coaxial with the central axis 9 and extend in the axial direction. A metal, such as, for example, stainless steel, is used as a material of the shaft 31. The shaft 31 is supported through a lubricating fluid (not shown) to be rotatable with respect to the sleeve 24 and the cap 25, and is arranged to rotate about the central axis 9 when the motor 11 is running. That is, in the present preferred embodiment, the bearing 23 is defined by the sleeve 24 and the cap 25, which belong to the stationary portion 2, the shaft 31, which belongs to the rotating portion 3, and the lubricating fluid arranged therebetween. A polyolester oil or a diester lubricant, for example, is used as the lubricating fluid. An upper end portion of the shaft 31 is arranged to project upward above an upper surface of the sleeve 24. Note, however, that the motor 11 may alternatively be arranged to include a bearing of another type, such as, for example, a plain bearing or a ball bearing, instead of a fluid dynamic bearing. Also note that the shaft 31 may alternatively be defined integrally with the hub 33, which will be described below.

The hub 33 is a member arranged to extend in an annular shape around the central axis 9. The hub 33 includes a hub annular portion 332, which is annular in shape, and a flange portion 333. The hub annular portion 332 is arranged above the stator 22. The flange portion 333 is arranged to extend radially outward from the hub annular portion 332, and one of the magnetic disks 121 is arranged on an upper surface of the flange portion 333. The hub annular portion 332 is fixed to the outer circumferential surface of the shaft 31, and is arranged to extend from an upper portion of the shaft 31 to assume an annular shape. A through hole 330 passing through the hub 33 in the axial direction is defined radially inside of the hub annular portion 332. The upper end portion of the shaft 31 is press fitted in the through hole 330.

An outer circumferential surface 631 of the hub annular portion 332 is fitted in the circular hole of each magnetic disk 121. At least a portion of an inner circumferential portion of each magnetic disk 121 is arranged to be in contact with the outer circumferential surface 631 of the hub annular portion 332. The magnetic disk 121 is thus supported while being radially positioned.

In addition, a lower surface of the lower magnetic disk 121 is arranged to be in contact with at least a portion of the upper surface of the flange portion 333, which is annular in shape. The magnetic disk 121 is thus supported while being axially positioned.

The magnet 34 is fixed to an inner circumferential surface of the yoke 35, which will be described below, through, for example, an adhesive. An annular permanent magnet is used as the magnet 34 according to the present preferred embodiment. The magnet 34 is substantially cylindrical, and is arranged radially outside of the stator 22. An inner circumferential surface of the magnet 34 includes north and south poles arranged to alternate with each other in the circumferential direction. In addition, the inner circumferential surface of the magnet 34 is arranged radially opposite to a radially outer end surface of each of the teeth 412 with a slight gap intervening therebetween. That is, the magnet 34 includes a pole surface arranged radially opposite to the stator 22. Note that a plurality of magnets may be used in place of the annular magnet 34. In the case where the plurality of magnets are used, the magnets are arranged on the inner circumferential surface of the yoke 35 such that pole surfaces of the north poles and pole surfaces of the south poles alternate with each other in the circumferential direction.

The structure of the yoke 35 will be described in detail below. A metal that is not a ferromagnetic material, such as, for example, an aluminum-based metal, is used as a material of the hub 33. In this case, use of a ferromagnetic material, such as, for example, an iron-based metal, as a material of the yoke 35 contributes to preventing magnetic flux generated from the magnet 34 from escaping outward, as described below.

Once electric drive currents are supplied to the coils 42 in the motor 11 described above, magnetic flux is generated around each of the teeth 412. In addition, a magnetic circuit passing through the stator 22, the magnet 34, and the yoke 35 is defined. Then, interaction between the magnetic flux of the teeth 412 and magnetic flux of the magnet 34 produces a circumferential torque between the stationary portion 2 and the rotating portion 3, so that the rotating portion 3 is caused to rotate about the central axis 9 with respect to the stationary portion 2. The magnetic disks 121 supported by the hub 33 are caused to rotate about the central axis 9 together with the rotating portion 3.

Next, the structure of the yoke 35 and an engagement portion 70 at which the yoke 35 and the hub 33 are fixed to each other will now be described below.

Figure 4:
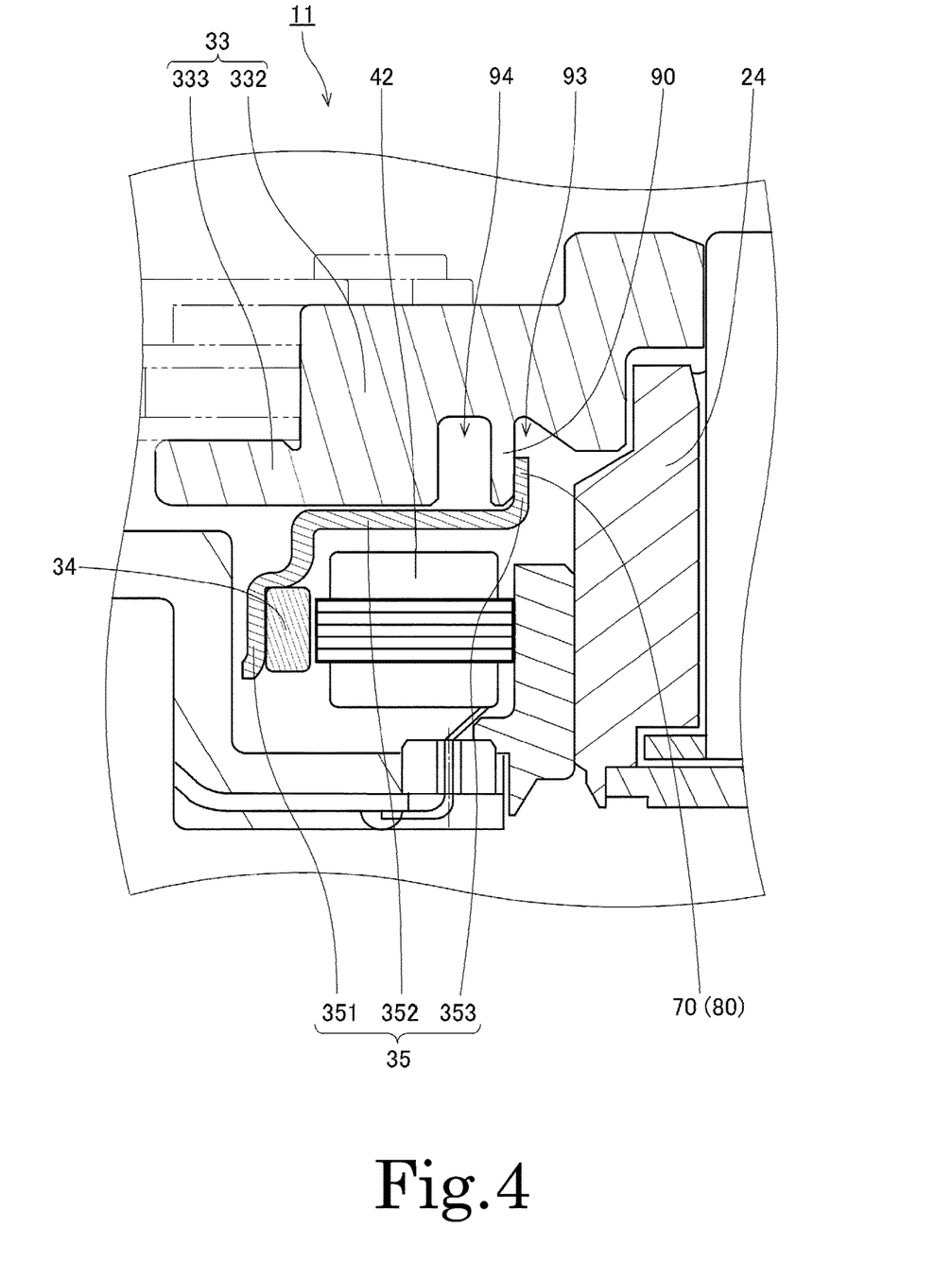
FIG. 4 is a partial vertical sectional view of the motor according to the second preferred embodiment.

FIG. 4 is a partial vertical sectional view of the motor 11. Referring to FIG. 4, the yoke 35 according to the present preferred embodiment includes a first yoke cylindrical portion 351, a yoke annular portion 352, and a second yoke cylindrical portion 353. The magnet 34 is fixed to a radially inner side of the first yoke cylindrical portion 351. The yoke annular portion 352 is arranged to extend radially inward from an upper end of the first yoke cylindrical portion 351, and an upper surface of the yoke annular portion 352 is arranged opposite to a lower surface of the hub 33. The second yoke cylindrical portion 353 is arranged to extend axially upward from a radially inner end portion of the yoke annular portion 352. Note that, when the upper surface of the yoke annular portion 352 is described as being arranged "opposite to" the lower surface of the hub 33, it may mean either that the upper surface of the yoke annular portion 352 is arranged opposite to the lower surface of the hub 33 with a gap therebetween, or that the upper surface of the yoke annular portion 352 is arranged to be in contact with the lower surface of the hub 33.

The hub annular portion 332 includes a hanging portion 90 arranged to extend downward from a lower portion of the hub annular portion 332, a first recessed portion 93, and a second recessed portion 94. The first recessed portion 93 is arranged radially inside of the hanging portion 90, and is recessed upward from a lower surface of the hub annular portion 332. Meanwhile, the second recessed portion 94 is arranged radially outside of the hanging portion 90, and is recessed upward from the lower surface of the hub annular portion 332. That is, the hanging portion 90 is defined between the first and second recessed portions 93 and 94.

An outer circumferential surface of the second yoke cylindrical portion 353 is press fitted to an inner circumferential surface of the hanging portion 90 of the hub annular portion 332, and is fixed thereto through an adhesive 80. The engagement portion 70 is thus defined. That is, the engagement portion 70 is defined by the inner circumferential surface of the hanging portion and the outer circumferential surface of the second yoke cylindrical portion 353. Note that the outer circumferential surface of the second yoke cylindrical portion 353 and the inner circumferential surface of the hanging portion 90 of the hub annular portion 332 may alternatively be fixed to each other through only press fitting or adhesion, or may alternatively be fixed to each other by another method, such as, for example, welding.

Note that an additional adhesive may be arranged between the upper surface of the yoke annular portion 352 and the lower surface of the hub 33. However, it is desirable that the amount of this adhesive be minimized to prevent a volume contraction of the adhesive when curing from causing a deformation of the flange portion 333.

Referring to FIG. 4, the inner circumferential surface of the hanging portion 90 and the outer circumferential surface of the second yoke cylindrical portion 353 are fixed to each other at a position radially inward of a radially inner end portion of each coil 42. In addition, in the present preferred embodiment, the yoke 35 is arranged to be out of contact with the flange portion 333. Arranging the engagement portion 70 at a position away from the flange portion 333 reduces an influence, on the flange portion 333, of a stress applied when the inner circumferential surface of the hanging portion 90 and the outer circumferential surface of the second yoke cylindrical portion 353 are fixed to each other. This contributes to preventing the flange portion 333 from being deformed. This in turn contributes to stable rotation of annular members 12, which include the magnetic disks 121, mounted on the flange portion 333. Moreover, the likelihood that an error in reading from any magnetic disk 121 will occur due to a deformation of the hub 33 is reduced.

Further, since the engagement portion 70 is arranged at the hanging portion 90 extending from the lower portion of the hub annular portion 332, the stress applied when the yoke 35 is fixed is concentrated on the hanging portion 90. This leads to further reducing the stress applied to the flange portion 333. This in turn contributes to more effectively preventing a deformation of the flange portion 333.

Furthermore, referring to FIG. 4, the flange portion 333 is arranged at a position radially outward of a radially outer end portion of each coil 42. The stress applied to the flange portion 333 can be further reduced by arranging the flange portion 333 radially outward of and at a large distance from the engagement portion 70 as described above.

Figure 5:
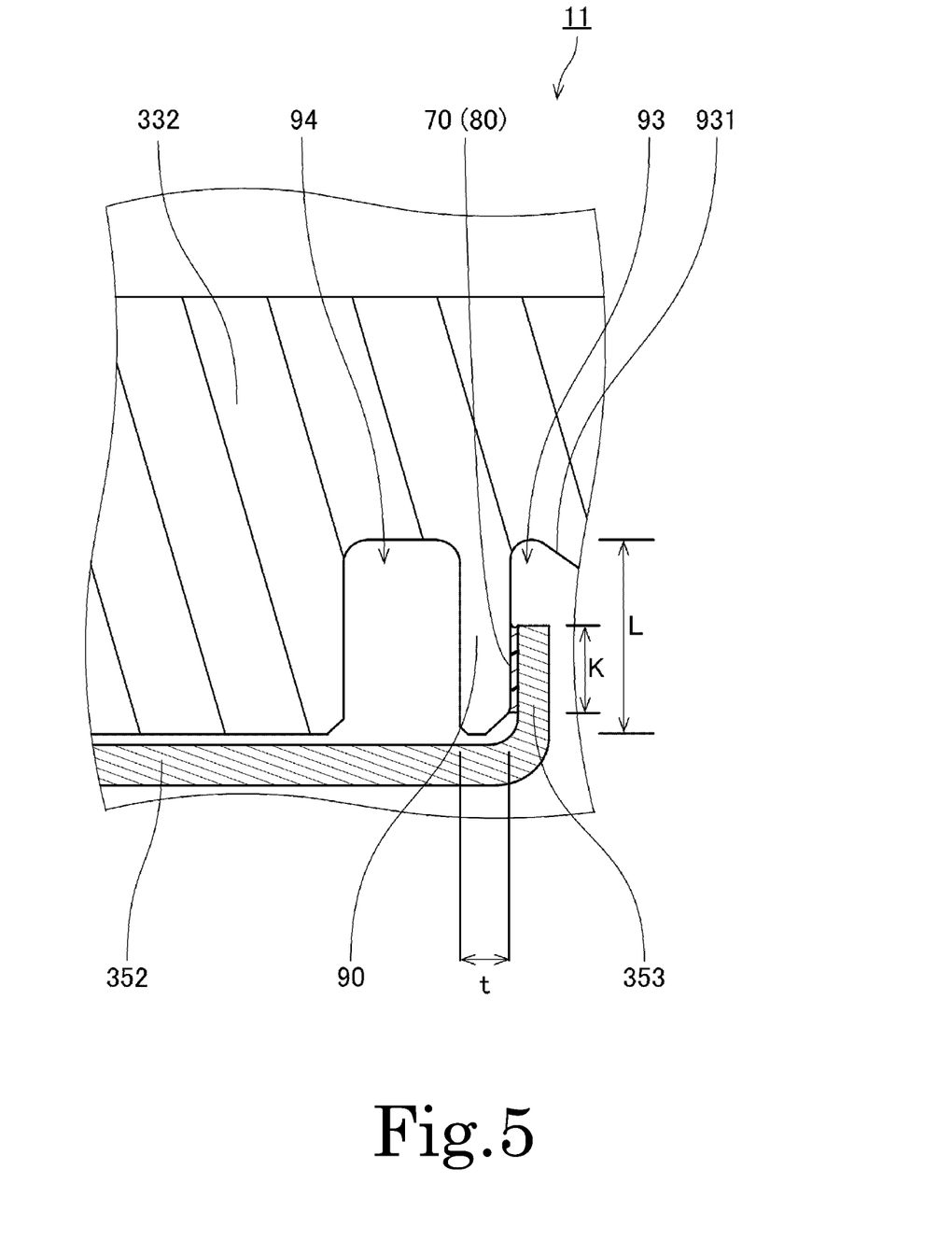
FIG. 5 is a partial vertical sectional view of the motor according to the second preferred embodiment.

FIG. 5 is a partial vertical sectional view of the motor 11. Referring to FIG. 5, the radial width t of the hanging portion 90 is smaller than the axial dimension L of the hanging portion 90. The increased axial dimension of the hanging portion 90 leads to an increased absorption by the hanging portion 90 of the stress applied to the engagement portion 70. The concentration of the stress on the hanging portion 90 leads to an additional reduction in the stress applied to the flange portion 333, reducing the likelihood that the flange portion 333 will be deformed.

In addition, the radial width t of the hanging portion 90 is smaller than the axial dimension K of the engagement portion 70. The increased axial dimension of the engagement portion 70 leads to a greater concentration of the stress on the hanging portion 90. This leads to an additional reduction in the stress applied to the flange portion 333, reducing the likelihood that the flange portion 333 will be deformed.

Referring to FIG. 4, at a position where the inner circumferential surface of the hub annular portion 332 and an outer circumferential surface of the sleeve 24 are opposed to each other, a labyrinth structure, which is a narrow gap, is defined to minimize evaporation of the lubricating fluid of the fluid dynamic bearing through a surface of the lubricating fluid. The hub 33 according to the present preferred embodiment has the first recessed portion 93 defined between the labyrinth structure and the hanging portion 90. This leads to ensuring a sufficient axial dimension of the labyrinth structure, and also enables an increase in the axial dimension of the hanging portion 90.

The first recessed portion 93 may have a slanting surface 931 extending radially outward with increasing height as illustrated in FIG. 5. This makes it easier to process a portion of the hub annular portion 332 adjacent to the first recessed portion 93, which has a complicated structure, when the first recessed portion 93 is defined.

Note that each of the first and second recessed portions 93 and 94 may not be defined. In other words, the hub annular portion 332 may alternatively be arranged to include only the hanging portion 90 extending downward from the lower portion of the hub annular portion 332 without having either of the first and second recessed portions 93 and 94. Also note that only one of the first and second recessed portions 93 and 94 may be defined.

While preferred embodiments of the present invention have been described above, it will be understood that the present invention is not limited to the above-described preferred embodiments.

Figure 6:
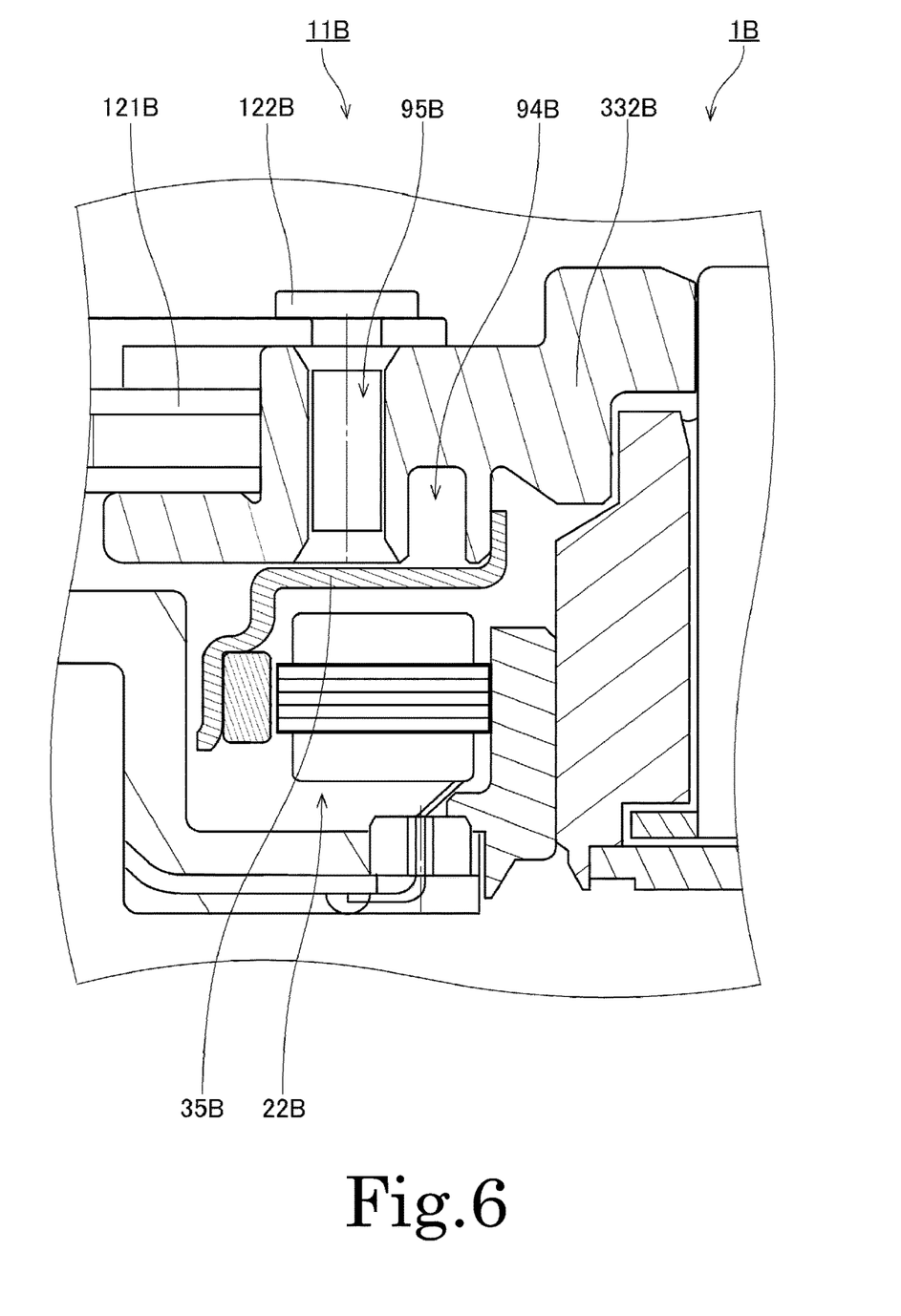
FIG. 6 is a partial vertical sectional view of a disk drive apparatus according to a modification of the second preferred embodiment.

FIG. 6 is a partial vertical sectional view of a disk drive apparatus 1B according to a modification of the second preferred embodiment. In the modification illustrated in FIG. 6, a hub annular portion 332B includes a through hole 95B. The through hole 95B is arranged radially outside of a second recessed portion 94B, and passes through the hub annular portion 332B in the axial direction. The disk drive apparatus 1B is generally provided with a structure to fix a clamper 122B for holding a magnetic disk 121B, and in this case, the through hole 95B can be used as a screw hole for fixing the clamper 122B. Notice that, in the present modification, a lower opening of the through hole 95B is covered with a yoke 35B. As a result, even if a burr or the like is produced and drops in processing the screw hole or inserting a screw, a further falling of the burr or the like will be blocked by the yoke 35B, preventing the burr or the like from coming near a stator 22B, reducing the possibility of an abnormal operation.

Note that at least a portion of the second recessed portion 94B may be arranged to pass through the hub annular portion 332B in the axial direction. In this case, the second recessed portion 94B can take the role of the above through hole 95B, making it possible to simplify the structure of the hub annular portion 332B and improve efficiency in processing.

Also note that a motor according to a preferred embodiment of the present invention may be a so-called fixed-shaft motor, in which a shaft belongs to a stationary portion and a sleeve belongs to a rotating portion. Also note that a motor and a disk drive apparatus according to a preferred embodiment of the present invention may be arranged to rotate a disk other than the magnetic disk, such as, for example, an optical disk.

Also note that an annular member according to a preferred embodiment of the present invention may include an impeller instead of a disk, and that a motor according to a preferred embodiment of the present invention may be used as a fan motor to supply an air current.

Note that the detailed shape of any member may be different from the shape thereof as illustrated in the accompanying drawings of the present application.

Also note that features of the above-described preferred embodiments and the modifications thereof may be combined appropriately as long as no conflict arises.

Preferred embodiments of the present invention are applicable to motors and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor arranged to rotate an annular member, the motor comprising:
    a stationary portion including a stator; and
    a rotating portion arranged to be rotatable about a central axis extending in a vertical direction; wherein
    the rotating portion includes:
        a hub arranged to extend in an annular shape around the central axis;
        a magnet including a pole surface arranged radially opposite to the stator; and
        a yoke to which the magnet is fixed;
    the stator includes:
        a stator core including a plurality of teeth arranged to project radially outward; and
        a plurality of coils each of which is defined by a conducting wire wound around a separate one of the teeth;
    the hub includes:
        a hub annular portion being annular and arranged above the stator; and
        a flange portion arranged to extend radially outward from the hub annular portion, and including an upper surface on which the annular member is arranged;
    the yoke includes:
        a first yoke cylindrical portion to which the magnet is fixed;
        a yoke annular portion arranged to extend radially inward from an upper end of the first yoke cylindrical portion, and including an upper surface arranged opposite to a lower surface of the hub; and
        a second yoke cylindrical portion arranged to extend axially upward from a radially inner end portion of the yoke annular portion; and
    an inner circumferential surface of the hub annular portion and an outer circumferential surface of the second yoke cylindrical portion are fixed to each other at an engagement portion arranged radially inward of a radially inner end portion of each coil wherein the yoke is arranged to be out of contact with the flange portion.

2. The motor according to claim 1, wherein the flange portion is arranged radially outward of a radially outer end portion of each coil.

3. The motor according to claim 1, wherein
    the hub annular portion includes a hanging portion arranged to extend downward from a lower portion thereof; and
    the engagement portion is defined by an inner circumferential surface of the hanging portion and the outer circumferential surface of the second yoke cylindrical portion.

4. The motor according to claim 3, wherein the hanging portion is arranged to have a radial width smaller than an axial dimension of the hanging portion.

5. The motor according to claim 3, wherein the hanging portion is arranged to have a radial width smaller than an axial dimension of the engagement portion.

6. The motor according to claim 3, wherein the hub annular portion includes a first recessed portion arranged radially inside of the hanging portion, and recessed upward from a lower surface of the hub annular portion.

7. The motor according to claim 3, wherein the hub annular portion includes a second recessed portion arranged radially outside of the hanging portion, and recessed upward from a lower surface of the hub annular portion.

8. The motor according to claim 7, wherein the hub annular portion includes a through hole passing therethrough in an axial direction, and arranged radially outside of the second recessed portion.

9. The motor according to claim 7, wherein at least a portion of the second recessed portion is arranged to pass through the hub in an axial direction.

10. The motor according to claim 1, wherein the hub is made of an aluminum-based metal, and the yoke is made of an iron-based metal.

11. The motor according to claim 1, wherein the inner circumferential surface of the hub annular portion and the outer circumferential surface of the second yoke cylindrical portion are fixed to each other through press fitting, adhesion, or welding.

12. A disk drive apparatus comprising:
    the motor of claim 1;
    an access portion arranged to perform at least one of reading and writing of information from or to a disk supported by the flange portion of the motor, the disk being the annular member; and
    a housing arranged to accommodate at least a portion of the motor and the access portion.

* * * * *